(12) United States Patent
Agrawal et al.

(10) Patent No.: US 10,006,465 B2
(45) Date of Patent: Jun. 26, 2018

(54) OIL-FREE WATER VAPOR BLOWER

(75) Inventors: Giridhari L. Agrawal, Simsbury, CT (US); Charles W. Buckley, West Hartford, CT (US); Jared Knechel, Manchester, CT (US)

(73) Assignee: R&D Dynamics Corporation, Bloomfield, CT (US)

( * ) Notice: Subject to any disclaimer, the term of this patent is extended or adjusted under 35 U.S.C. 154(b) by 1004 days.

(21) Appl. No.: 13/251,582

(22) Filed: Oct. 3, 2011

(65) Prior Publication Data

US 2012/0082575 A1 Apr. 5, 2012

Related U.S. Application Data

(60) Provisional application No. 61/388,811, filed on Oct. 1, 2010.

(51) Int. Cl.
| | |
|---|---|
| *F04D 29/057* | (2006.01) |
| *F04D 29/58* | (2006.01) |
| *F04D 25/06* | (2006.01) |
| *F04D 25/08* | (2006.01) |

(52) U.S. Cl.
CPC ....... *F04D 29/057* (2013.01); *F04D 25/0606* (2013.01); *F04D 29/5846* (2013.01); *F04D 25/082* (2013.01); *F16C 2360/46* (2013.01)

(58) Field of Classification Search
CPC ...... F04D 25/082; F04D 25/06; F04D 25/062; F04D 29/5806; F04D 29/584; F04D 29/5846; F04D 25/0606; F04D 29/057; F04D 29/0413; F04D 29/0476; F16C 33/10–33/1095; F16C 2360/46

USPC ........ 417/366–371, 372, 357, 423.8, 423.12, 417/423.13
See application file for complete search history.

(56) References Cited

U.S. PATENT DOCUMENTS

| | | | |
|---|---|---|---|
| 2,226,986 A | 12/1940 | Wechsberg et al. | |
| 2,488,945 A * | 11/1949 | Troller | F04D 19/002 417/362 |
| 2,694,157 A | 11/1954 | Cone | |

(Continued)

OTHER PUBLICATIONS

Giri L. Agrawal, "Foil Air/Gas Bearing Technology—An Overview," Presented at the International Gas Turbine & Aeroengine Congress & Exhibition, Jun. 2-Jun. 5, 1997, pp. 1-11, 97-GT-347.

*Primary Examiner* — Devon Kramer
*Assistant Examiner* — Joseph Herrmann
(74) *Attorney, Agent, or Firm* — McCormick, Paulding & Huber LLP

(57) ABSTRACT

A high-speed, single-stage, motor-driven blower designed to move water vapor includes an axial flow compressor and a rotating assembly supported by gas foil bearings and driven by a brushless permanent magnet synchronous motor utilizing a remotely mounted variable frequency drive. The blower is immersed in a water vapor flow for operation. Accordingly, the blower comprises an outer blower housing and an inner blower housing defining an annular cavity therebetween, wherein the inner blower housing is held within the outer blower housing by seals, and contains and protects the motor components and the bearings against water damage and contamination. A cooling flow may be leaked through the inner blower housing to cool the internal operational components of the blower and to capture heat therefrom, which can be added to the water vapor flow moving through the blower.

18 Claims, 2 Drawing Sheets

(56) References Cited

U.S. PATENT DOCUMENTS

| | | | |
|---|---|---|---|
| 2,735,027 A | 2/1956 | Formhals et al. | |
| 3,022,739 A | 2/1962 | Herrick et al. | |
| 3,094,272 A | 6/1963 | McClure | |
| 3,221,498 A * | 12/1965 | Bankston | F02K 9/82 239/11 |
| 3,296,824 A | 1/1967 | Rohrs et al. | |
| 3,391,291 A | 7/1968 | Benson et al. | |
| 3,615,121 A * | 10/1971 | Barnett | F16C 17/024 384/103 |
| 3,680,364 A * | 8/1972 | Carrier | G01N 31/222 116/206 |
| 3,981,628 A | 9/1976 | Carter | |
| 4,167,295 A | 9/1979 | Glaser | |
| 4,262,975 A | 4/1981 | Heshmat et al. | |
| 4,277,707 A * | 7/1981 | Silver et al. | 310/104 |
| 4,362,020 A | 12/1982 | Meacher et al. | |
| 4,402,618 A | 9/1983 | Fortmann et al. | |
| 4,415,280 A | 11/1983 | Agrawal | |
| 4,415,281 A | 11/1983 | Agrawal | |
| 4,523,896 A | 6/1985 | Lhenry et al. | |
| 4,557,664 A | 12/1985 | Tuttle et al. | |
| 4,558,228 A | 12/1985 | Larjola | |
| 4,713,739 A | 12/1987 | Ryder et al. | |
| 4,865,517 A | 9/1989 | Beehler | |
| 5,045,711 A | 9/1991 | Swearingen | |
| 5,310,311 A | 5/1994 | Andres et al. | |
| 5,375,651 A | 12/1994 | Colwell | |
| 5,474,429 A * | 12/1995 | Heidelberg et al. | 417/356 |
| 5,634,723 A | 6/1997 | Agrawal | |
| 5,642,008 A | 6/1997 | McCracken | |
| 5,794,300 A | 8/1998 | McCracken et al. | |
| 5,845,509 A | 12/1998 | Shaw et al. | |
| 5,857,348 A | 1/1999 | Conry | |
| 5,911,510 A * | 6/1999 | Saville | F16C 17/042 384/103 |
| 6,050,727 A | 4/2000 | Messmer et al. | |
| 6,102,672 A | 8/2000 | Woollenweber et al. | |
| 6,155,802 A | 12/2000 | Choi et al. | |
| 6,293,121 B1 * | 9/2001 | Labrador | 62/304 |
| 6,302,661 B1 | 10/2001 | Khanwilkar et al. | |
| 6,307,278 B1 | 10/2001 | Nims et al. | |
| 6,375,438 B1 | 4/2002 | Seo | |
| 6,450,781 B1 | 9/2002 | Petrovich et al. | |
| 6,471,493 B2 | 10/2002 | Choi et al. | |
| 6,488,467 B2 | 12/2002 | Czechowski et al. | |
| 6,498,410 B1 | 12/2002 | Yashiro et al. | |
| 6,499,955 B2 | 12/2002 | Choi et al. | |
| 6,523,366 B1 | 2/2003 | Bonaquist et al. | |
| 6,564,560 B2 * | 5/2003 | Butterworth et al. | 62/84 |
| 6,579,078 B2 | 6/2003 | Hill et al. | |
| 6,634,853 B1 | 10/2003 | Anderson | |
| 6,698,929 B2 | 3/2004 | Choi et al. | |
| 6,752,533 B2 * | 6/2004 | Saville | F16C 17/042 384/105 |
| 6,948,853 B2 | 9/2005 | Agrawal | |
| 6,951,241 B1 | 10/2005 | Gatley | |
| 6,997,686 B2 | 2/2006 | Agrawal et al. | |
| 7,063,519 B2 | 6/2006 | Agrawal et al. | |
| 7,070,330 B2 | 7/2006 | Agrawal | |
| 7,261,300 B2 | 8/2007 | Agrawal et al. | |
| 7,394,175 B2 * | 7/2008 | McAuliffe et al. | 310/58 |
| 7,757,502 B2 * | 7/2010 | Merritt | B64D 13/06 417/405 |
| 7,819,641 B2 * | 10/2010 | Decker et al. | 417/370 |
| 7,948,105 B2 | 5/2011 | Agrawal et al. | |
| 8,029,194 B2 | 10/2011 | Agrawal et al. | |
| 8,215,928 B2 | 7/2012 | Agrawal et al. | |
| 2004/0066991 A1 | 4/2004 | Agrawal | |
| 2004/0189126 A1 | 9/2004 | Brunet et al. | |
| 2008/0219844 A1 * | 9/2008 | Decker et al. | 415/219.1 |
| 2008/0232962 A1 | 9/2008 | Agrawal et al. | |

* cited by examiner

OIL-FREE WATER VAPOR BLOWER

CROSS-REFERENCE TO RELATED APPLICATION

This application claims the benefit of U.S. Provisional Application No. 61/388,811, filed Oct. 1, 2010, which is incorporated herein by reference.

FIELD OF THE INVENTION

The field of the present invention generally pertains to the conception, design and manufacture of turbomachinery, such as blowers, and associated technologies integrating such devices. More particularly, the present invention relates to motor-driven blowers designed to move and circulate water vapor. The present invention also relates to a mechanical vapor recompression system and cycle incorporating a motor-driven blower designed to move and circulate water vapor.

BACKGROUND OF THE INVENTION

Movement and circulation of water vapor is typically accomplished using a blower in which the motor and bearings for the blower are isolated from the water vapor through the use of various seal arrangements within the blower housing. Isolating the internal components of the blower from the water vapor prevents corrosion of the components. This isolation further protects the motor to prevent undesired electrical issues during operation of the blower.

Prior art blowers designed for moving water vapor commonly use brushless permanent magnet motors. Such motors can be sealed from the water vapor moving through the blower quite easily, but sealing around rotating parts of the blower requires a more complex design than typical blowers. For example, the rotating parts of a blower often require lubrication for efficient operation and for cooling to prevent damage from over-heating. Leakage from the lubricant or coolant for the blower's rotating parts may cause contamination of the water vapor, or vice versa. Since seals often permit some amount of leakage, contamination of the water vapor with lubricant or coolant is disadvantageous for the operation of typical water vapor blowers. Complex designs are thus necessary to minimize and manage leakage and contamination issues within the blower, which is also a disadvantage in providing an effective blower design.

In addition to the disadvantages presented by the issues of leakage and contamination within the blower, the isolation of the motor and other internal blower parts from the water vapor makes it difficult to adequately contain the heat that is generated by these parts during operation of the blower. This heat is lost to the environment, which affects the efficiency of the system. To contain the heat using prior art blower designs, an additional system is needed to collect and manage the heat, which adds to the complexity, size and cost of the system.

In view of the foregoing, there is a need for a blower for moving and circulating water vapor, and preferably sub-atmospheric water vapor, that can operate efficiently without leakage or contamination that affects the water vapor moving therethrough, and that can prevent heat loss from the system, all without suffering from the drawbacks common to prior art blower designs that tend to affect performance, operation and efficiency. Accordingly, it is a general object of the present invention to provide a blower for moving and circulating water vapor that removes the problems of leakage and heat loss, particularly by immersing the entire blower in the water vapor. Gas foil bearings used in the present invention are lubricated by the water vapor itself, as opposed to a separate lubricant, so there is no possibility of the above-mentioned contamination typically associated with prior art blowers and the drawbacks associated therewith. Further, the heat generated by the blower is transferred to the water vapor, and the heat can then be recovered through common heat exchanger methods since water vapor is highly effective at carrying and transferring thermal energy.

SUMMARY OF THE INVENTION

The present invention is generally directed to a motor-driven blower especially adapted to moving and circulating water vapor, and more particularly sub-atmospheric water vapor. The blower is particularly designed for highly reliable and efficient movement, circulation, and compression of water vapor in mechanical vapor recompression (MVR) water purification systems and methods.

In a first aspect of the present invention, a blower for moving water vapor comprises an outer blower housing having an inlet and an outlet, an axial flow compressor or fan mounted within the outer blower housing at the inlet end thereof for rotation about an axis, and an inner blower housing mounted within the outer blower housing adjacent to the compressor. The inner blower housing defines an internal passage therethrough between an inlet and an outlet of the inner blower housing which houses a motor, a rotating assembly operatively associated with the motor and mounted within the inner blower housing for rotation about the axis, at least two journal bearing assemblies and at least one thrust bearing assembly. Rotation of the rotating assembly effects rotation of the axial compressor or fan, which generates a water vapor flow through the outer blowing housing between the inlet and outlet thereof.

During operation of the blower, a portion of the water vapor flow generated in the outer blower housing flows into the inlet of the inner blower housing, through the internal passage defined therein, and out of the outlet of the inner blower housing, where such portion of water vapor flow mixes with the water vapor flow generated by the compressor.

In accordance with an embodiment of the present invention, the blower provides movement of water vapor through a duct or annular cavity defined between the outer blower housing and the inner blower housing without contamination of the water vapor flow, and without heat loss from the blower to the environment.

In accordance with another aspect of the present invention, internal motor and blower components are protected against water damage and contamination from a water vapor flow moving through the blower by encapsulating them within an inner blower housing, which preferably is a plastic shell that is sealed against the inner diameter of an outer blower housing, for example, with o-rings or the like. During operation of the blower in accordance with the present invention, the flow of water vapor passes through the annular cavity formed between the inner blower housing and the outer blower housing.

In accordance with an aspect of the present invention, a cooling scheme is provided to allow heat generated by the blower to pass into the water vapor that the blower is moving.

The blower includes a rotating assembly operatively connected to the motor that is supported by at least two gas foil journal bearings (radial load) and a set of gas foil thrust bearings (axial load) mounted within the inner housing of the blower. In preferred embodiments of the present invention, the bearings are lubricated with a small amount of water vapor that passes through the internal passage defined in the inner blower housing. This internal flow of water vapor is driven through the inner blower housing by a pressure difference between the inlet and outlet of the internal passage. The pressure difference is created by the diffusion of the main flow of the water vapor from one end of the inner blower housing to the other.

In another aspect of the present invention, movement of water vapor through the blower is aided by a single-stage, axial flow compressor or fan operatively associated with the rotating assembly for rotation about an axis during operation.

In alternate embodiments of the present invention, a small amount of water or coolant may be sprayed onto the front side of the inner blower housing during operation of the blower to provide cooling for the motor, bearings and other components disposed within the inner blower housing.

In an aspect of the present invention, the motor in the blower is preferably powered by a variable frequency drive.

In an aspect of a system embodying a blower in accordance with the present invention, the blower is mounted in line with inlet and outlet ducting through flanges provided at either end.

An advantage of the present invention is that there is no possibility of oil or lubricant contamination in the water vapor flow since the blower is oil-free.

Another advantage of the present invention is that heat generated by the blower is moved into the water vapor flow, which is useful for energy savings.

Another advantage of the present invention is that the blower of the present invention is readily adaptable to various application and systems where water vapor, and in particular, sub-atmospheric water vapor, must be moved and circulated.

There are many applications for the blower of the present invention where the desired result is movement and circulation of water vapor. For example, the present invention generally relates to a mechanical vapor recompression system and cycle incorporating a motor-driven blower designed to move and circulate water vapor. Additional applications for a motor-driven blower for moving and circulating water vapor include, but are not limited to, commercial or industrial dryer systems; commercial kitchen ventilation systems; and food or chemical processing systems.

The present invention is also directed to a water purification method utilizing a motor-driven blower especially adapted for moving and circulating water vapor. In general, such a water purification method may fall under the category of distillation, so that blowers in accordance with embodiments of the present invention can be applied to any type of distillation plant.

These and other features of the present invention are described with reference to the drawings of preferred embodiments of a motor-driven blower for moving and circulating water vapor, and a system embodying such a blower. The illustrated embodiments of blowers and systems in accordance with the present invention are intended to illustrate, but not limit, the invention.

DETAILED DESCRIPTION OF THE INVENTION AND PREFERRED EMBODIMENTS THEREOF

Figure 1:
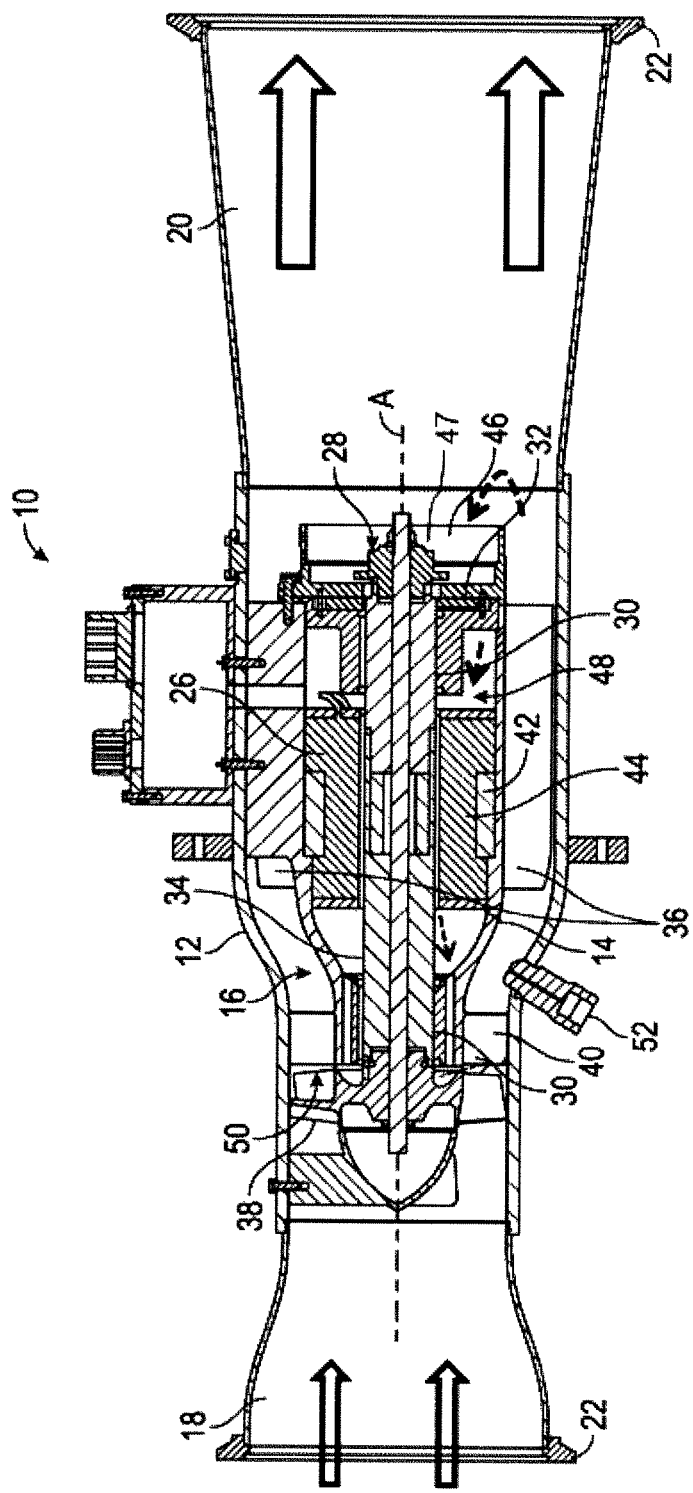
FIG. 1 illustrates a cross-sectional view of a blower in accordance with the present invention.

Referring to FIG. 1, a cross-sectional view of a blower 10 in accordance with the present invention showing internal components thereof is provided. As shown, the blower 10 comprises an outer housing 12 and an inner housing 14 disposed therein to define an annular cavity or duct 16 for moving and circulating water vapor through the blower 10 between an inlet 18 and an outlet 20 of the outer blowing housing 12. The blower 10 may be mounted in line with inlet and outlet ducting 12 and 14 through flanges 22 provided at either end, as generally illustrated in FIG. 1.

The inner blower housing 14 preferably takes the form of a plastic shell that is sealed against the inner diameter of the outer blower housing 12, for example, with o-rings 24 or the like, and houses a motor 26, a rotating assembly 28 operatively associated with the motor 26 for rotation about an axis A, front and rear journal bearing assemblies 30, and a thrust bearing assembly 32. The rotating assembly 28 generally includes a rotating shaft 34 that is radially supported within the inner blower housing 14 by the pair of journal bearing assemblies 30, and axially supported by the thrust bearing assembly 32. A plurality of cooling fins 36 is disposed on the outer surface of the inner blower housing 14, each projecting into the annular cavity 16. When the water vapor is moved through the blower 10, it passes through the cooling fins 36 for cooling the internal components of the blower 10 housed within the inner blower housing 14, such as the motor 26, the rotating assembly 28, and the bearings 30 and 32.

An axial flow compressor or fan 38 is disposed within the outer blower housing 12 for drawing water vapor through the blower 10 between the inlet 18 and the outlet 20 of the outer blower housing 12 so as to generate a water vapor flow through the annular cavity or duct 16 within the blower 10. The axial fan 38 is disposed within the outer blower housing 12 adjacent to the inner blower housing 14. More particularly, the axial fan 38 is disposed adjacent to the forward end of the inner housing 14 and operatively associated with the rotating assembly 28 housed within the inner blower housing 14 for rotation about the axis A. During operation, the motor 26 effects rotation of the rotating assembly 28, which, in turn, effects rotation of the axial fan 38. Rotation of the axial fan 38 draws water vapor into the outer blower housing 12 via the inlet 18, moves the water vapor through a set of aero stator vanes 40 disposed within the outer blower housing 12 for completing an axial-flow compression stage within the blower 10 in combination with the rotor blades of the axial fan 38 immediately upstream. Rotation of the axial fan 38 also directs the water vapor within the annular cavity 16 and over and around the inner blower housing 14, and forces the water vapor out of the blower 10 through the outlet 20. Preferably, the axial fan 38 comprises a single-stage, axial flow compressor or fan.

In accordance with preferred embodiments of the present invention, the blower 10 is preferably a high-speed, single-stage, motor-driven blower designed to move and circulate water vapor, and more preferably sub-atmospheric water vapor, in numerous applications. The motor 26 used in the blower 10 is preferably a brushless permanent magnet synchronous motor powered by a remotely located variable frequency drive (not shown). As shown in FIG. 1, the motor 26 comprises a motor rotor 42 mounted to or forming part of the rotating shaft 34, and a motor stator assembly 44 disposed around the motor rotor 42 and press fitted into the inner blower housing 14. In a preferred motor design, the motor rotor 42 includes a permanent magnet and the motor stator assembly 44 includes coils encircling the motor rotor 42 to operatively interact with the permanent magnet. Thus, in operation, the motor 26 gets its input power through the variable frequency drive, which energizes the motor stator assembly 44, which in turn interacts with the motor rotor 42 to rotate the rotating shaft 34 at desired operational speeds.

As noted above, the rotating assembly 28 is also operatively connected to the axial flow fan 38, typically via the rotating shaft 34. Accordingly, rotation of the rotating shaft 34 rotates the fan 38 to generate and effect flow of the water vapor through the blower 10.

The motor components and bearing assemblies are protected against water damage and contamination by encapsulating them within the inner blower housing 14, which protects them from direct exposure to the main water vapor flow. The main flow of the water vapor in the blower 10 is moved through the annular cavity 16 formed between the outer blower housing 12 and the inner blower housing 14. However, because the operational components of the blower 10—i.e., the motor 26, the rotating assembly 28 and the bearings 30 and 32—typically generate heat during operation, it is desirable to cool these components to avoid damage and premature failure of the blower and to maintain efficient operation and production. Therefore, in accordance with preferred embodiments of the present invention, a small, controlled portion of the water vapor flow moving through the blower 10 between the inlet 18 and the outlet 20 is leaked into and redirected back through the inner blower housing 14 for cooling internal components of the blower 10, such as the motor 26, the rotating assembly 28, and the bearings 30 and 32.

As illustrated in FIG. 1, a portion of the water vapor flow may be leaked into an inner housing inlet 47 located at the rear end of the inner blower housing 14, so that it may pass over and through internal operative components housed within the inner blower housing 14. More particularly, the inlet end 46 of the inner blower housing 14 comprises a plurality of holes designed to improve flow circulation through inner passages formed within the inner blower housing 14. In the illustrated embodiment, the inner blower housing 14 defines an internal passage 48 in which components of the blower 10, such as the motor 26, the rotating assembly 28, and the bearings 30 and 32, are housed. The internal passage 48 extends between the inner housing inlet 47, located at the rear end of the inner blower housing 14, and an inner housing outlet 50, located at the forward end of the inner blower housing 14 adjacent to the axial fan 38. Thus, the water vapor flow leaked into the internal passage 48 of the inner blower housing 14 via the holes of the inlet 46 is directed past the thrust bearing assembly 32, through the rear journal bearing assembly 30, through an annulus between the motor rotor 42 and the motor stator 44, through the front journal bearing assembly 30, and to the outlet 50 of the inner blower housing 14.

The internal flow of the water vapor through the inner blower housing 14 is driven by a small pressure difference between the inlet 46 and outlet 50 of the internal passage 48. The pressure difference is created, in general, by the diffusion of the main flow of the water vapor around the inner blower housing 14 from one end thereof to the other. The water vapor exits the outlet 50 of the inner blower housing 14 through a gap between the axial fan 38 and the inner blower housing 14 and mixes in with the main water vapor flow passing through the outer blower housing 12. The heat that is generated by the motor 26 and rotating assembly 28 captured by this water vapor flow moving through the inner blower housing 14, which is useful for energy savings and efficient operation of the blower 10. The captured heat is then added to the main water vapor flow moving through the outer blower housing 12. The captured heat can then be recovered through common heat exchanger methods since water vapor is highly effective at carrying and transferring thermal energy. Improved flow circulation formed through the inner blower housing 14 between the inlet 46 and the outlet 50 increases heat transfer from the operating components of the blower 10 to the main water vapor flow.

As noted above, cooling fins 36 are also preferably provided on the outer surface of the inner blower housing 14 to improve heat transfer from within the inner blower housing 14. Additionally, the stator vanes 40 provided at the forward end of the inner blower housing adjacent to the axial fan 38 improve heat transfer from the inner blower housing 14 into the flow of water vapor passing through the annular cavity 16.

The bearing assemblies 30 and 32 used in the present invention are preferably gas foil bearings that are lubricated by the water vapor itself, thereby eliminating the need to use oil or lubricant, and as a result eliminating the contamination common with prior art blower designs and avoiding the drawbacks associated with such contamination. Thus, in accordance with the present invention, all bearings in the blower 10 are preferably oil free to maximize performance and life of the blower 10. For example, in the journal bearing assemblies 30, foil gas journal bearings sit inside journal bearing sleeves that are attached to the inner blower housing 14, as illustrated in FIG. 1. Additionally, the thrust bearing assembly 32 comprises foil gas thrust bearings positioned within the inner blower housing 14 around a thrust runner formed with or attached to the rotating shaft 34, as illustrated in FIG. 1. As so positioned, the thrust bearings are pinned and sandwiched between a stacked assembly comprising the rear journal bearing sleeve and the thrust runner and an end cap/tie rod of the rotating assembly. One thrust bearing is disposed about the thrust runner to operate in clockwise direction relative to the rotating assembly 28, while the other thrust bearing is disposed as a counterclockwise bearing relative to the rotating assembly 28.

In preferred embodiments of the present invention, pairs of foil-type hydrodynamic gas journal and thrust bearings support the rotating shaft 34. Alternatively, the present invention can be used for blowers supported on oil-free, ceramic-type ball bearings or pressurized hydrostatic bearings without compromising design or operation of the blower.

In alternate embodiments of the present invention, a small amount of water or coolant may be sprayed onto the forward end of the inner blower housing 14 during operation to provide cooling for the motor 26, rotating assembly 28, and bearings 30 and 32 contained therein. As shown in FIG. 1, spray nozzles 52 mounted on the outer blower housing 12 inject a fine mist of water or coolant onto the exterior surface of the inner blower housing 14 and the cooling fins 36 to counter the high temperature of the water vapor passing thereby and to cool the blower components. As the components within the inner blower housing 14 are cooled, heat is extracted therefrom and added to the main water vapor flow moving through the outer blower housing 12. The heat may vaporize the cooling water or lubricant, which is added to the main water vapor flow.

This cooling approach may be used in addition to or in lieu of the internal cooling cycle moving through the inner blower housing 14, the cooling fins 36 on the outer surface of the inner blower housing 14, and the aero stator vanes 40, as discussed above, and various combinations thereof.

Figure 2:
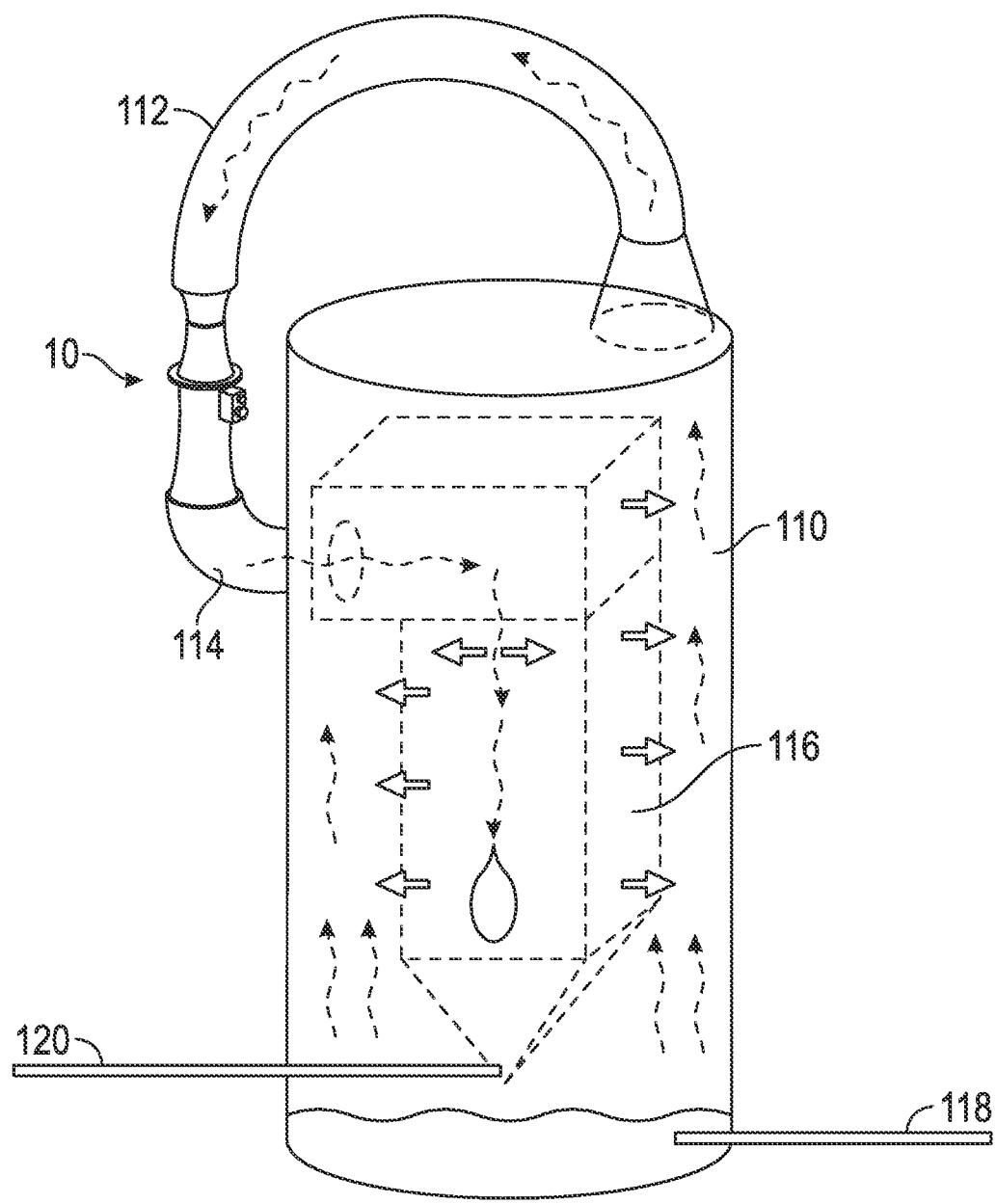
FIG. 2 illustrates a schematic application of the blower of FIG. 1 in a mechanical vapor recompression system.

Referring to FIG. 2, an example of an application for the blower 10 of the present invention is illustrated. More particularly, the blower 10 is illustrated in connection with a mechanical vapor recompression cycle.

As illustrated, the mechanical vapor recompression cycle includes a water vapor blower 10, as described above, connected to an evaporator tank 110 via inlet ducting 112 and outlet ducting 114. The evaporator tank 110 houses a heat exchanger 116 operatively connected to the outlet ducting 114 to receive a water vapor flow exiting the blower 10. The evaporator tank 110 further includes an inlet 118 for dirty water. The heat exchanger 116 further includes an outlet 120 exiting through the evaporator tank 110 for clean water and condensate collected in the heat exchanger 116.

In operation of the illustrated mechanical vapor recompression cycle, dirty water enters the evaporator tank 110 through the evaporator inlet 118 (Step 1). The dirty water is initially heated within the evaporator tank 110 by heat from the heat exchanger 116 disposed therein until evaporation starts to produce water vapor (Step 2). The water vapor that is produced is clean, leaving concentrated impurities at the bottom of the evaporator tank 110 (Step 3), where they can be pumped out and managed separately. The water vapor rises to the top of the evaporator tank 110 and exits via the inlet ducting 112 connected between the evaporator tank 110 and the blower 10.

Clean water vapor is then moved and circulated (and consequently heated) by the blower 10 in the general manner described above (Step 4). The blower 10 compresses the water vapor. The water vapor is also heated during the compression process as it passes through the blower 10. Additional heat enters the vapor flow from the internal operating components—namely, the motor 26, rotating assembly 28 and bearing assemblies 30 and 32—since, as described in accordance with the present invention, such components are effectively immersed in the vapor flow, albeit protected from contamination by the inner blower housing 14. The capture of the heat from such operating components increases the overall efficiency of the system, since the heat is ultimately used in the system, as described herein, and not lost to the ambient environment.

The water vapor flow exiting the blower 10 moves to the heat exchanger 116 disposed within the evaporator tank 110 via the outlet ducting 114, where the water vapor's heat is captured (Step 5) and transferred to the system's incoming dirty water (Step 6). This heat transfer process condenses the clean water vapor within the heat exchanger 116 to produce clean liquid water and condensate (Step 7). The clean water and condensate collects, via gravity, at the bottom of the heat exchanger 110 and can be drawn from the heat exchanger 116 and the evaporator tank 110 via outlet 120. The heat extracted from the water vapor flow as it is condensed by the heat exchanger 116 perpetuates the evaporation of the dirty water within the evaporator tank 110 (Step 2). From that point, initial heating required from the heat exchanger 116 can stop, and the heat input from the blower 10 is sufficient to keep the mechanical vapor recompression cycle going.

As illustrated, the blower 10 is provided for moving and circulating water vapor, and in preferred operations, sub-atmospheric water vapor, and operates efficiently without undesirable leakage or contamination that affects the water vapor moving therethrough.

In this exemplary embodiment, the present invention is also directed to a water purification method utilizing a motor-driven blower especially adapted for moving and circulating water vapor. In general, such a water purification method may fall under the category of distillation, so that blowers in accordance with embodiments of the present invention can be applied to any type of distillation plant.

Additional applications for a motor-driven blower for moving and circulating water vapor in accordance with the present invention include, but are not limited to, commercial or industrial dryer systems; commercial kitchen ventilation systems; and food or chemical processing systems.

The foregoing description of embodiments of the invention has been presented for the purpose of illustration and description. It is not intended to be exhaustive or to limit the invention to the form disclosed. Obvious modifications and variations are possible in light of the above disclosure. The embodiments described were chosen to best illustrate the principles of the invention and practical applications thereof to enable one of ordinary skill in the art to utilize the invention in various embodiments and with various modifications as suited to the particular use contemplated. It is intended that the scope of the invention be defined by the claims appended hereto.

What is claimed is:

1. A blower for moving water vapor, comprising:
 an outer blower housing having an inlet and an outlet;
 an axial flow compressor mounted within the outer blower housing at the inlet for rotation about an axis, whereby rotation of the axial flow compressor generates a water vapor flow through the outer blower housing between the inlet and the outlet; and
 an inner blower housing mounted within the outer blower housing adjacent to the axial flow compressor, said inner blower housing defining an internal passage between an inlet and an outlet of the inner blower housing and including therein a motor, a rotating assembly operatively associated with the motor for rotating the rotating assembly, and at least two journal bearing assemblies and a thrust bearing assembly, which are gas foil bearing assemblies supporting the rotating assembly;
 wherein a portion of the water vapor flow generated in the outer blower housing is leaked into the internal passage of the inner blower housing via the inlet of the inner blower housing, said portion of the water vapor flow passing through the internal passage and out of the outlet of the inner blower housing where said portion of the water vapor flow mixes with the water vapor flow generated by the axial flow compressor;
 wherein the portion of the water vapor flow through the internal passage lubricates the gas foil bearing assemblies.

2. The blower according to claim 1, wherein the axial flow compressor is operatively connected to the rotating assembly so that rotation of the rotating assembly effects rotation of the axial flow compressor.

3. The blower according to claim 1, wherein the inner blower housing further comprises a plurality of cooling fins formed on the outer surface thereof, each of said cooling fins projecting into an annular cavity formed between the outer blower housing and the inner blower housing.

4. The blower according to claim 3, wherein the outer blower housing includes a spray nozzle mounted therein and operatively connected to a coolant source, wherein said spray nozzle is capable of projecting a coolant into the annular cavity and onto the outer surface of the inner blower housing.

5. The blower according claim 4, further comprising a plurality of aero stator vanes disposed within the annular cavity defined between the outer blower housing and the inner blower housing.

6. The blower according to claim 3, wherein the water vapor flow leaked from the outer blower housing into the internal passage of the inner blower housing has been compressed to sub-atmospheric water vapor by the axial flow compressor.

7. The blower according to claim 1, wherein the portion of the water vapor flow passing through the internal passage of the inner blower housing is driven by a pressure difference between the inlet and the outlet of the inner blower housing.

8. The blower according to claim 7, wherein the pressure difference between the inlet and the outlet of the inner blowing housing is influenced by the diffusion of the water vapor flow through the annular cavity around the inner blower housing.

9. The blower according claim 1, further comprising a plurality of aero stator vanes disposed within annular cavity defined between the outer blower housing and the inner blower housing.

10. A blower for moving water vapor, comprising:
an outer blower housing having an inlet and an outlet;
an axial flow compressor mounted within the outer blower housing proximate the inlet thereof for rotation about an axis, whereby rotation of the axial flow compressor generates a water vapor flow through the outer blower housing between the inlet and the outlet; and
  an inner blower housing mounted within the outer blower housing adjacent to the axial flow compressor and forming an annular cavity between the outer blower housing and the inner blower housing through which said water vapor flow passes, said inner blower housing defining an internal passage between an inlet and an outlet of the inner blower housing and including therein a motor, a rotating assembly operatively associated with the motor for rotating the rotating assembly, and at least two journal bearing assemblies and a thrust bearing assembly, which are gas foil bearing assemblies;
  wherein the outer blower housing includes a spray nozzle mounted therein and operatively connected to a coolant source for projecting a coolant into the annular cavity and onto the outer surface of the inner blower housing for cooling the motor, the rotating assembly, the journal bearing assemblies and the thrust bearing assembly disposed therein;
  wherein a portion of the water vapor flow generated in the outer blower housing is leaked into the internal passage of the inner blower housing via the inlet of the inner blower housing, passes through the internal passage and out of the outlet of the inner blower housing, and thereby lubricates the gas foil bearing assemblies, said portion of the water vapor flow then mixing with the water vapor flow generated by the axial flow compressor.

11. The blower according to claim 10, wherein the axial flow compressor is operatively connected to the rotating assembly so that rotation of the rotating assembly effects rotation of the axial flow compressor.

12. The blower according to claim 10, wherein the inner blower housing further comprises a plurality of cooling fins formed on the outer surface thereof, each of said cooling fins projecting into the annular cavity formed between the outer blower housing and the inner blower housing.

13. The blower according to claim 12 wherein the axial flow compressor compresses the portion of the water vapor flow to sub-atmospheric water vapor before it enters the internal passage.

14. The blower according to claim 13, wherein the portion of the water vapor flow passing through the internal passage of the inner blower housing is driven by a pressure difference between the inlet and the outlet of the inner blower housing.

15. The blower according to claim 14, wherein the pressure difference between the inlet and the outlet of the inner blowing housing is influenced by the diffusion of the water vapor flow through the annular cavity around the inner blower housing.

16. The blower according claim 13, further comprising a plurality of aero stator vanes disposed within annular cavity defined between the outer blower housing and the inner blower housing.

17. The blower according to claim 10, further comprising a plurality of aero stator vanes disposed within the annular cavity defined between the outer blower housing and the inner blower housing.

18. A method for moving water vapor comprising:
providing a blower comprising:
  an outer blower housing having an inlet and an outlet;
  an axial flow compressor mounted within the outer blower housing at the inlet for rotation about an axis, whereby rotation of the axial flow compressor generates a water vapor flow through the outer blower housing between the inlet and the outlet; and
  an inner blower housing mounted within the outer blower housing adjacent to the axial flow compressor, said inner blower housing defining an internal passage between an inlet and an outlet of the inner blower housing and including therein a motor, a rotating assembly operatively associated with the motor for rotating the rotating assembly, and at least two journal bearing assemblies and a thrust bearing assembly, which are gas foil bearing assemblies supporting the rotating assembly;
  wherein a portion of the water vapor flow generated in the outer blower housing is leaked into the internal passage of the inner blower housing via the inlet of the inner blower housing, said portion of the water vapor flow passing through the internal passage and out of the outlet of the inner blower housing where said portion of the water vapor flow mixes with the water vapor flow generated by the axial flow compressor;
  wherein the portion of the water vapor flow through the internal passage lubricates the gas foil bearing assemblies; and
operating the blower to move water vapor.

* * * * *